(12) United States Patent
Sugano et al.

(10) Patent No.: US 12,122,379 B2
(45) Date of Patent: Oct. 22, 2024

(54) AUTOMATED VALET PARKING SYSTEM, CONTROL METHOD FOR AUTOMATED VALET PARKING SYSTEM, AND AUTONOMOUS DRIVING VEHICLE

(71) Applicant: TOYOTA JIDOSHA KABUSHIKI KAISHA, Toyota (JP)

(72) Inventors: Tatsuya Sugano, Shizuoka-ken (JP); Koji Morita, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 17/944,599

(22) Filed: Sep. 14, 2022

(65) Prior Publication Data

US 2023/0087852 A1    Mar. 23, 2023

(30) Foreign Application Priority Data

Sep. 22, 2021    (JP) ................ 2021-154073

(51) Int. Cl.
*B60W 30/165*    (2020.01)
*B60W 30/06*    (2006.01)
*B60W 30/18*    (2012.01)

(52) U.S. Cl.
CPC .......... *B60W 30/165* (2013.01); *B60W 30/06* (2013.01); *B60W 30/181* (2013.01); *B60W 2554/4041* (2020.02); *B60W 2554/80* (2020.02)

(58) Field of Classification Search
CPC .. B60W 30/165; B60W 30/06; B60W 30/181; B60W 2554/4041; B60W 2554/80; B60W 60/001; B60W 2720/10; B62D 15/026; B62D 15/0285; G05D 1/0293; G05D 1/0297; G08G 1/143; G08G 1/148; G06Q 50/40; B60Y 2300/06

See application file for complete search history.

(56) References Cited

U.S. PATENT DOCUMENTS

2009/0164109 A1    6/2009    Maruyama
2015/0191176 A1*   7/2015    Kobana ................ B60W 50/12
                                                         701/70
2017/0327151 A1   11/2017    Nordbruch
(Continued)

FOREIGN PATENT DOCUMENTS

JP    2009-149254 A    7/2009
JP    2019-137364 A    8/2019
(Continued)

*Primary Examiner* — Behrang Badii
(74) *Attorney, Agent, or Firm* — Dinsmore & Shohl LLP

(57) ABSTRACT

System that causes a first vehicle and a second vehicle to perform automated valet parking includes one or more processors configured to cause, a second vehicle to perform follow-up traveling to follow a first vehicle; set a stop position between the first vehicle and the second vehicle when the second vehicle is performing the follow-up traveling to follow the first vehicle in the parking place; calculate, between the stop position and a position where the second vehicle starts deceleration to stop at the stop position; and set a target vehicle-to-vehicle distance of the second vehicle from the first vehicle, and set, as the target vehicle-to-vehicle distance, a distance longer than a sum of the deceleration start distance and a margin distance from the stop position to the first vehicle.

6 Claims, 9 Drawing Sheets

(56) References Cited

U.S. PATENT DOCUMENTS

| | | | |
|---|---|---|---|
| 2018/0208245 A1* | 7/2018 | Mizutani | B60W 30/06 |
| 2020/0148197 A1 | 5/2020 | Yoon et al. | |
| 2021/0213941 A1* | 7/2021 | Fukasawa | B62D 15/0285 |
| 2022/0274597 A1 | 9/2022 | Cayol et al. | |
| 2023/0118619 A1* | 4/2023 | Horihata | G06T 7/70 |
| | | | 340/937 |

FOREIGN PATENT DOCUMENTS

| | | |
|---|---|---|
| JP | 2020-079079 A | 5/2020 |
| JP | 2021-039561 A | 3/2021 |
| WO | 2021/043589 A1 | 3/2021 |

* cited by examiner

AUTOMATED VALET PARKING SYSTEM, CONTROL METHOD FOR AUTOMATED VALET PARKING SYSTEM, AND AUTONOMOUS DRIVING VEHICLE

CROSS-REFERENCE TO RELATED APPLICATION

This application claims priority to Japanese Patent Application No. 2021-154073 filed on Sep. 22, 2021, incorporated herein by reference in its entirety.

BACKGROUND

1. Technical Field

The present disclosure relates to an automated valet parking system, a control method for the automated valet parking system, and an autonomous driving vehicle.

2. Description of Related Art

Japanese Unexamined Patent Application Publication No. 2020-079079 (JP 2020-079079 A) is known as a technical document relating to an automated valet parking system. This publication describes a method for automated valet parking in which a parking place control server (infrastructure) causes a vehicle to perform autonomous parking.

SUMMARY

When the parking place control server simultaneously executes automated valet parking for multiple autonomous driving vehicles that travel along the same traveling path, the parking place control server may cause a succeeding vehicle to perform follow-up traveling to follow a preceding vehicle. The vehicle speed during the follow-up traveling is adjusted by an autonomous driving function of the succeeding vehicle. If a deceleration instruction from the parking place control server to avoid approach to the preceding vehicle and determination to accelerate by the autonomous driving function of the succeeding vehicle through the follow-up traveling are intermingled, there is a possibility that the succeeding vehicle repeats acceleration and deceleration and the traveling efficiency decreases.

An automated valet parking system that causes a first vehicle and a second vehicle that are autonomous driving vehicles to perform automated valet parking according to a first aspect of the present disclosure includes one or more processors configured to cause the second vehicle to perform follow-up traveling to follow the first vehicle in a parking place, the follow-up traveling being included in automated valet parking; set a stop position between the first vehicle and the second vehicle when the second vehicle is performing the follow-up traveling to follow the first vehicle in the parking place; calculate, based on a position of the second vehicle, a vehicle speed of the second vehicle, and the stop position, a deceleration start distance between the stop position and a position where the second vehicle starts deceleration to stop at the stop position; set a target vehicle-to-vehicle distance of the second vehicle from the first vehicle in the follow-up traveling; and set, as the target vehicle-to-vehicle distance, a distance longer than a sum of the deceleration start distance and a margin distance from the stop position to the first vehicle.

A second aspect of the present disclosure relates to a control method to be executed by an automated valet parking system that causes a first vehicle and a second vehicle that are autonomous driving vehicles to perform automated valet parking. The control method includes causing the second vehicle to perform follow-up traveling to follow the first vehicle in a parking place, the follow-up traveling being included in automated valet parking; setting a stop position between the first vehicle and the second vehicle when the second vehicle is performing the follow-up traveling to follow the first vehicle in the parking place; calculating, based on a position of the second vehicle, a vehicle speed of the second vehicle, and the stop position, a deceleration start distance between the stop position and a position where the second vehicle starts deceleration to stop at the stop position; and setting a target vehicle-to-vehicle distance of the second vehicle from the first vehicle in the follow-up traveling, the target vehicle-to-vehicle distance being set as a distance longer than a sum of the deceleration start distance and a margin distance from the stop position to the first vehicle.

An autonomous driving vehicle according to a third aspect of the present disclosure includes acquire, from a parking place control server, a stop position set between a preceding vehicle and the autonomous driving vehicle by the parking place control server when the autonomous driving vehicle is performing follow-up traveling to follow the preceding vehicle in a parking place in response to an instruction from the parking place control server, the follow-up traveling being included in automated valet parking; calculate, based on a position of the autonomous driving vehicle, a vehicle speed of the autonomous driving vehicle, and the stop position, a deceleration start distance between the stop position and a position where the autonomous driving vehicle starts deceleration to stop at the stop position; set a target vehicle-to-vehicle distance of the autonomous driving vehicle from the preceding vehicle in the follow-up traveling; and set the target vehicle-to-vehicle distance as a distance longer than a sum of the deceleration start distance and a margin distance from the stop position to the preceding vehicle.

According to the aspects of the present disclosure, it is possible to suppress a decrease in the traveling efficiency during the follow-up traveling in the parking place in the automated valet parking.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of the present disclosure will be described below with reference to the drawings.

First Embodiment

Figure 1:
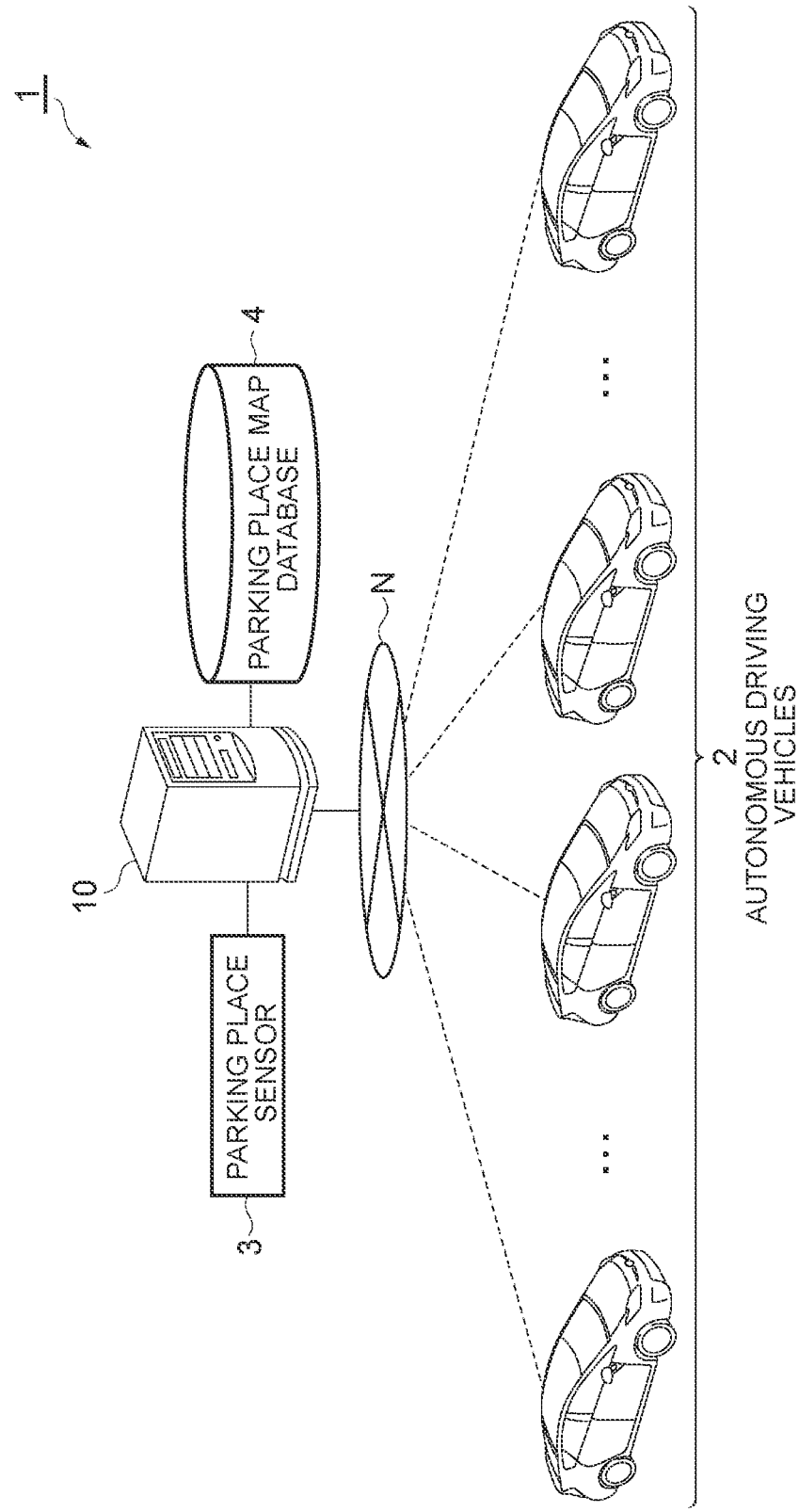
FIG. 1 is a diagram illustrating an automated valet parking system according to a first embodiment.

FIG. 1 is a diagram illustrating an automated valet parking system according to a first embodiment. An automated valet parking system (AVPS) 1 shown in FIG. 1 performs automated valet parking on a plurality of autonomous driving vehicles 2 in a parking place. Details of the autonomous driving vehicle 2 will be described later.

The automated valet parking is a service in which an unmanned autonomous driving vehicle 2 after a user (occupant) has dropped off at a drop-off area in the parking place is controlled by the automated valet parking system to travel along a target route in response to an instruction from the parking place side and automatically park in a target parking space in the parking place. The target parking space is a parking space preset as a parking position of the autonomous driving vehicle 2. The target route is a route in the parking place where the autonomous driving vehicle 2 travels to reach the target parking space. The target route at the time of exit is a route to be traveled to reach a pick-up space described later.

The parking place may be a parking place dedicated to the automated valet parking, or may be a parking place that can be used for both communicable vehicles and general vehicles. The parking place may be divided into parking spaces for the automated valet parking and the other parking spaces and have common traveling paths.

Figure 2:
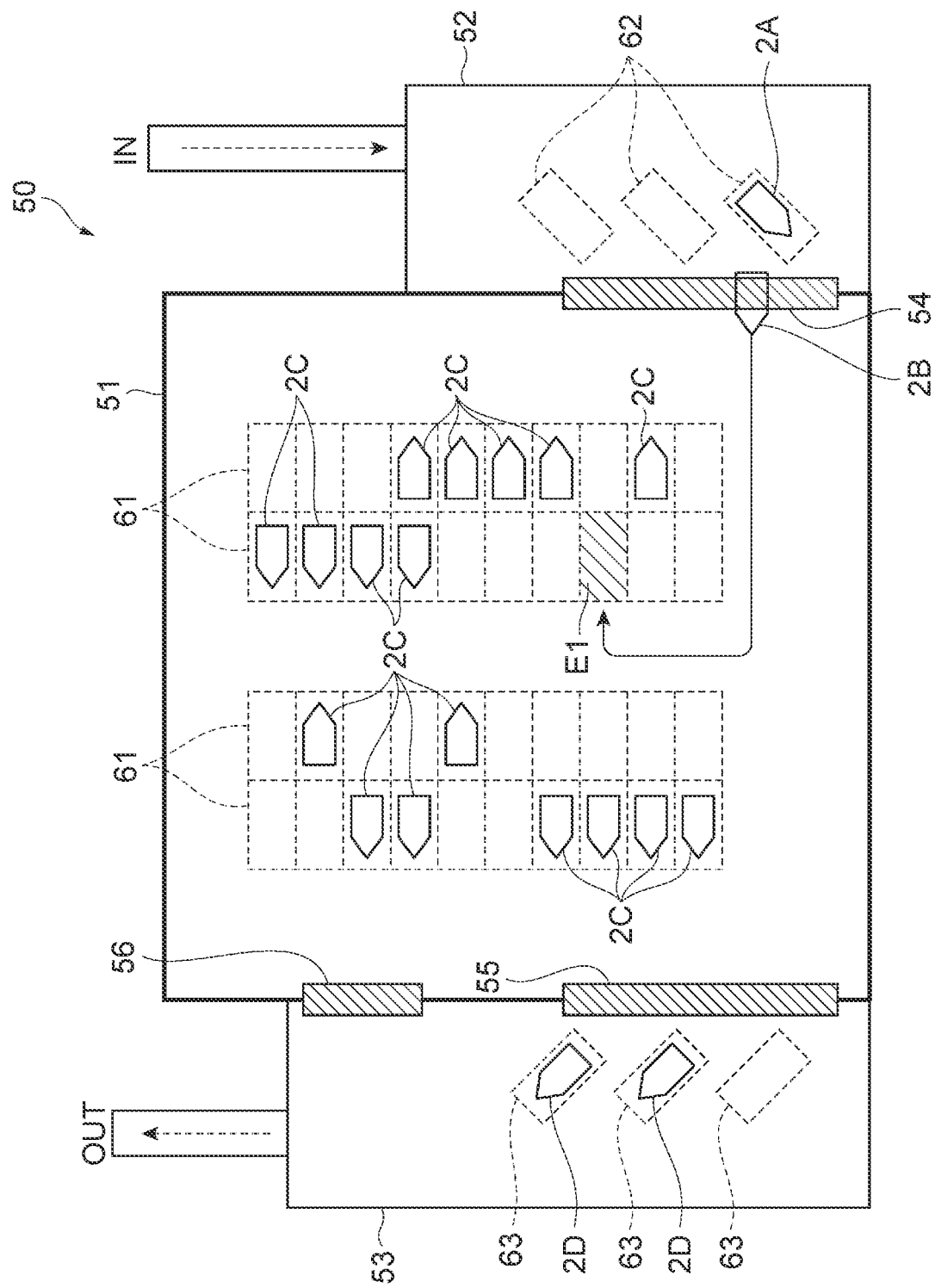
FIG. 2 is a plan showing an example of a parking place where automated valet parking is performed.

FIG. 2 is a plan showing an example of the parking place where the automated valet parking is performed. FIG. 2 shows a parking place 50, a parking area 51, a drop-off area 52, and a pick-up area 53. The parking place 50 includes the parking area 51, the drop-off area 52, and the pick-up area 53. The drop-off area 52 and the pick-up area 53 need not be provided separately, and may be provided as an integrated drop-off and pick-up area.

The parking area 51 is a place including parking spaces 61 where the autonomous driving vehicles 2 are parked by the automated valet parking. As shown in FIG. 2, for example, multiple parking spaces 61 are arrayed in one direction (for example, a vehicle width direction for a parked vehicle).

The drop-off area 52 is provided on an entrance side of the parking place 50 as a place where occupants including the user drop off the autonomous driving vehicle 2 before entering the parking area. The drop-off area 52 includes drop-off spaces 62 where the autonomous driving vehicle 2 stops when the occupant drops off. The drop-off area 52 leads to the parking area 51 via an entry gate 54.

The pick-up area 53 is provided on an exit side of the parking place 50 as a place where occupants including the user are picked up by the autonomous driving vehicle 2 that has exited the parking area. The pick-up area 53 includes pick-up spaces 63 where the autonomous driving vehicle 2 stands by to pick up the occupants. The pick-up area 53 leads to the parking area 51 via an exit gate 55. The parking space 61, the drop-off space 62, and the pick-up space 63 each serve as the target parking space that is a target of parking (including stopping) of the autonomous driving vehicle 2. A return gate 56 for returning the autonomous driving vehicle 2 from the pick-up area 53 to the parking area 51 is provided between the pick-up area 53 and the parking area 51. In some embodiments, the return gate 56 is not provided.

FIG. 2 shows an autonomous driving vehicle 2A stopped in the drop-off space 62 of the drop-off area 52, an autonomous driving vehicle 2B traveling in the parking place 50, an autonomous driving vehicle 2C parked in the parking space 61 of the parking area 51, and an autonomous driving vehicle 2D stopped in the pick-up space 63 of the pick-up area 53.

For example, the automated valet parking system 1 starts the automated valet parking by obtaining instruction authority for the autonomous driving vehicle 2 after the autonomous driving vehicle 2 that has entered the parking place 50 drops off the occupant in the drop-off space 62 (corresponding to the autonomous driving vehicle 2A). The automated valet parking system 1 drives the autonomous driving vehicle 2B that has entered the parking area 51, and automatically parks the autonomous driving vehicle 2B in a target parking space E1. When an exit instruction is received from the user, the automated valet parking system 1 drives the parked autonomous driving vehicle 2B toward the pick-up area 53, and automatically parks the autonomous driving vehicle 2B in the pick-up space 63 (corresponding to the autonomous driving vehicle 2D).

Configuration of Automated Valet Parking System

Hereinafter, the configuration of the automated valet parking system 1 will be described with reference to the drawings. As shown in FIG. 1, the automated valet parking system 1 includes a parking place control server 10. The parking place control server 10 manages the parking place.

The parking place control server 10 is communicable with the autonomous driving vehicles 2 via a network N. Details of the autonomous driving vehicle 2 will be described later. The parking place control server 10 may be provided in the parking place or in a facility remote from the parking place. The parking place control server 10 may be constituted by multiple computers provided at different locations. The parking place control server 10 is connected to a parking place sensor 3 and a parking place map database 4.

The parking place sensor 3 is used for recognizing a situation in the parking place. The parking place sensor 3 includes, for example, a surveillance camera for detecting the position of the autonomous driving vehicle 2 in the parking place. The surveillance camera is provided on the ceiling or wall of the parking place and images the autonomous driving vehicle 2 in the parking place. The surveillance camera transmits a captured image to the parking place control server 10.

The parking place sensor 3 may include a vacancy sensor for detecting whether vehicles are parked in the parking spaces (whether the parking spaces are full or vacant). The vacancy sensor may be provided for each parking space, or may be provided on the ceiling or the like so that a plurality of parking spaces can be monitored by one vacancy sensor. The configuration of the vacancy sensor is not particularly limited, and a well-known configuration can be adopted. The vacancy sensor may be a pressure sensor, a radar sensor or a sonar sensor using radio waves, or a camera. The vacancy sensor transmits vacancy information in the parking spaces to the parking place control server 10.

The parking place map database 4 stores parking place map information. The parking place map information includes information on the positions of the parking spaces in the parking place, and information on traveling paths in the parking place. The parking place map information may include position information of landmarks to be used for position recognition of the autonomous driving vehicles 2. The landmarks include at least one of white lines, poles, traffic cones, and parking place pillars.

Figure 3:
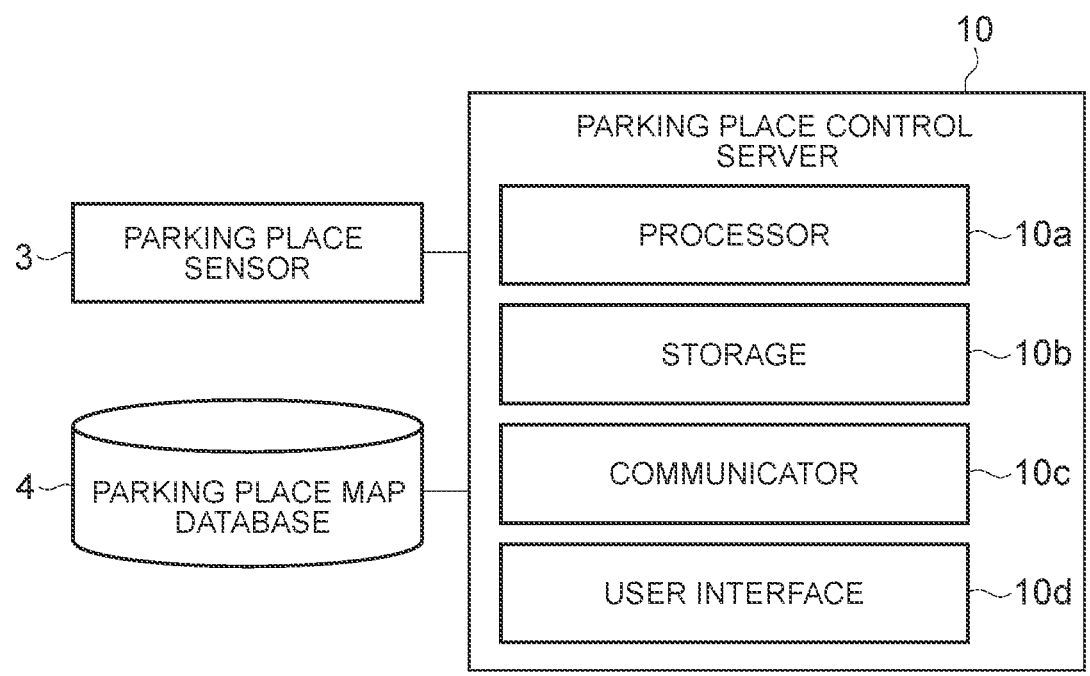
FIG. 3 is a diagram showing an example of a hardware configuration of a parking place control server.

The hardware configuration of the parking place control server 10 will be described. FIG. 3 is a block diagram showing an example of the hardware configuration of the parking place control server. As shown in FIG. 3, the parking place control server 10 is a general computer including a processor 10a, a storage 10b, a communicator 10c, and a user interface 10d.

The processor 10a operates various operating systems to control the parking place control server 10. The processor 10a is an arithmetic unit such as a central processing unit (CPU) including a control device, an arithmetic device, a register, and the like. The processor 10a controls the storage 10b, the communicator 10c, and the user interface 10d. The storage 10b is a recording medium including, for example, at least one of a read only memory (ROM), a random access memory (RAM), a hard disk drive (HDD), and a solid state drive (SSD).

The communicator 10c is a communication device for performing wireless communication via a network. Examples of the communicator 10c include a network device, a network controller, and a network card. The parking place control server 10 communicates with the autonomous driving vehicles 2 by using the communicator 10c. The user interface 10d is an input/output unit of the parking place control server 10 for an administrator of the parking place control server 10. The user interface 10d includes an output device such as a display and a loudspeaker, and an input device such as a touch panel.

Figure 4:
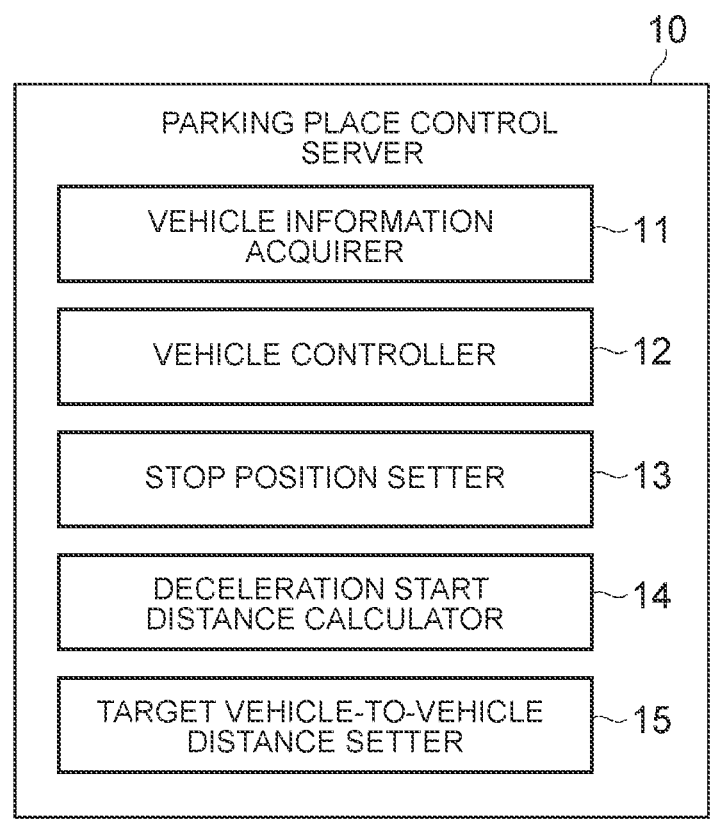
FIG. 4 is a diagram showing an example of a functional configuration of the parking place control server.

Next, the functional configuration of the parking place control server 10 will be described. FIG. 4 is a diagram showing an example of the functional configuration of the parking place control server 10. As shown in FIG. 4, the parking place control server 10 (CPU) includes a vehicle information acquirer 11, a vehicle controller 12, a stop position setter 13, a deceleration start distance calculator 14, and a target vehicle-to-vehicle distance setter 15.

The vehicle information acquirer 11 acquires vehicle information of the autonomous driving vehicle 2 by communicating with the autonomous driving vehicle 2 in the parking place. The vehicle information includes identification information of the autonomous driving vehicle 2 and position information of the autonomous driving vehicle 2 in the parking place. The identification information may be any information that can identify the individual autonomous driving vehicle 2. Examples of the identification information include an identification number (ID number), a vehicle number, and a reservation number for automated valet parking.

The vehicle information may include a vehicle type of the autonomous driving vehicle 2, or a vehicle number in addition to the identification information. The vehicle information may include entry reservation information such as an entry reservation time, or an expected exit time. The vehicle information may include vehicle body information such as a turning radius, a size, and a vehicle width of the autonomous driving vehicle 2, or information related to an autonomous driving function of the autonomous driving vehicle 2. The information related to the autonomous driving function may include version information of the autonomous driving function.

The vehicle information may include traveling conditions of the autonomous driving vehicle 2, and results of recognition of an external environment (for example, vehicle-to-vehicle distance from a preceding vehicle). The traveling conditions and the recognition of the external environment will be described later. The vehicle information may include information on the remaining travelable distance or the remaining fuel of the autonomous driving vehicle 2.

The vehicle information acquirer 11 continuously acquires the vehicle information from the autonomous driving vehicle 2 during the automated valet parking. The vehicle information acquirer 11 may suspend the acquisition of the vehicle information when the autonomous driving vehicle 2 is parked, or may acquire the vehicle information periodically.

The vehicle information acquirer 11 recognizes the situation of the autonomous driving vehicle 2 during the automated valet parking based on the acquired vehicle information. The situation of the autonomous driving vehicle 2 includes a position of the autonomous driving vehicle 2 in the parking place. The situation of the autonomous driving vehicle 2 may include a vehicle speed of the autonomous driving vehicle 2, a yaw rate of the autonomous driving vehicle 2, and distances between the autonomous driving vehicle 2 and other surrounding vehicles.

The vehicle controller 12 determines a target parking space of the autonomous driving vehicle 2 based on the vehicle information acquired by the vehicle information acquirer 11 and a parking status of the parking place. The vehicle controller 12 generates a target route in the parking place for the autonomous driving vehicle 2 to reach the target parking space. The vehicle controller 12 causes the autonomous driving vehicle 2 to automatically park in the target parking space by instructing the autonomous driving vehicle 2 to travel along the target route.

The vehicle controller 12 may give an instruction to the autonomous driving vehicle 2 by using a plurality of waypoints preset in the parking place. The waypoint is a virtually set positional point (passing point) in the parking place. For example, the waypoints are set at regular intervals along an extending direction of a traveling path in the parking place. The waypoint setting intervals need not be regular intervals. The waypoint setting intervals may be changed in sections such as curves or an area near the entrance and exit of the parking place.

Figure 5A:
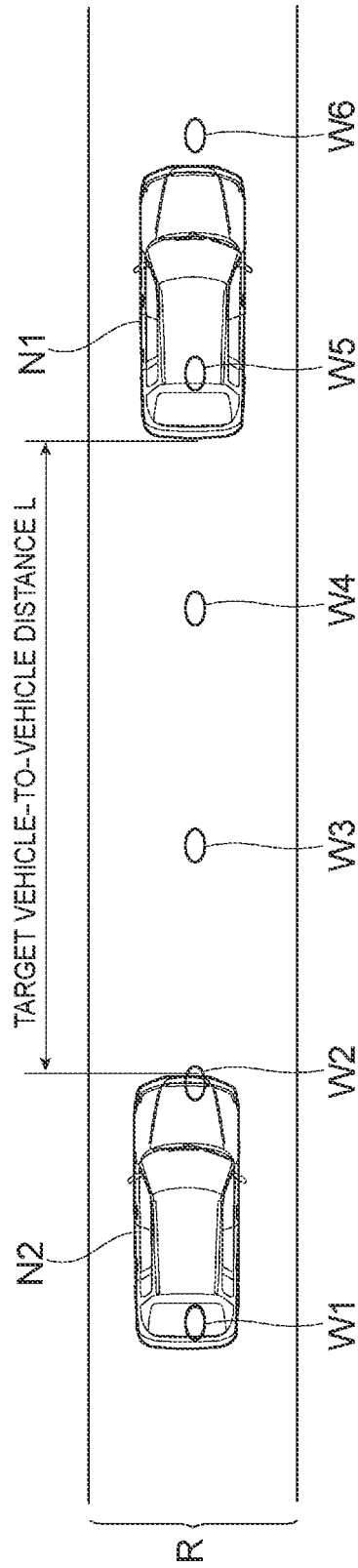
FIG. 5A is a diagram illustrating waypoints in a parking place.

FIG. 5A is a diagram illustrating the waypoints in the parking place. FIG. 5A shows a traveling path R, a first vehicle N1 and a second vehicle N2 that are the autonomous driving vehicles 2 traveling under instruction from the parking place control server 10, and waypoints W1 to W6. As shown in FIG. 5A, the waypoints W1 to W6 are set, for example, at regular intervals at the center of the traveling path R in the width direction along the extending direction of the traveling path R.

When two or more autonomous driving vehicles 2 travel on the same traveling path, the vehicle controller 12 instructs the succeeding vehicle to perform follow-up traveling to follow the preceding vehicle. The vehicle controller 12 may provide further conditions for instructing to perform the follow-up traveling, such as a condition that the distance between the preceding vehicle and the succeeding vehicle is equal to or shorter than a predetermined distance.

The vehicle controller 12 instructs the second vehicle N2 to perform the follow-up traveling to follow the preceding first vehicle N1 in the situation shown in FIG. 5A. The vehicle controller 12 instructs the second vehicle N2 about a target vehicle-to-vehicle distance L set by the target vehicle-to-vehicle distance setter 15 described later. The second vehicle N2 performs the follow-up traveling by adjusting the vehicle speed so that the vehicle-to-vehicle distance from the first vehicle N1 reaches the target vehicle-to-vehicle distance instructed by the vehicle controller 12. The vehicle speed in the follow-up traveling is adjusted through determination made by the second vehicle N2. Hereinafter, description is given under the assumption that the preceding vehicle to be followed is the first vehicle N1 and the succeeding vehicle that performs the follow-up traveling is the second vehicle N2.

Figure 5B:
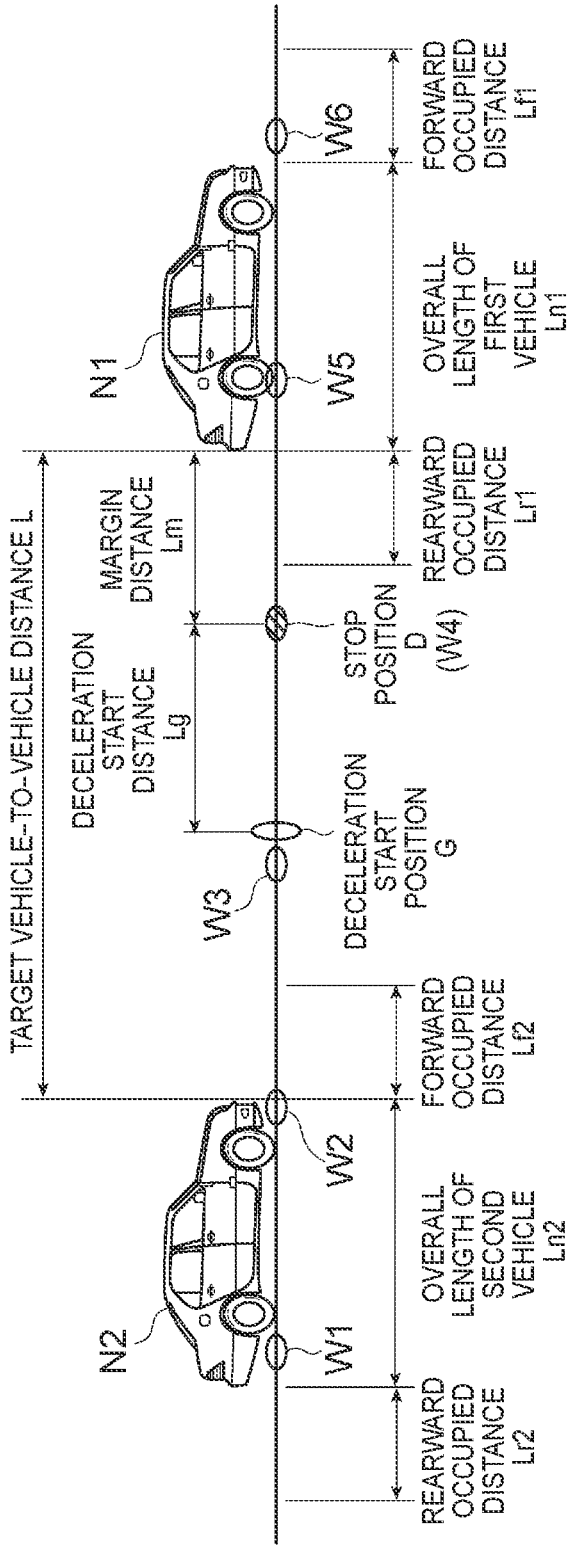
FIG. 5B is a diagram illustrating setting of a stop position.

The stop position setter 13 sets a stop position D between the first vehicle N1 and the second vehicle N2 when the second vehicle N2 is performing the follow-up traveling to follow the first vehicle N1 in the parking place. The stop position setter 13 sets the stop position D based on the positions of the first vehicle N1 and the second vehicle N2. FIG. 5B is a diagram illustrating the setting of the stop position. FIG. 5B shows the stop position D (waypoint W4), a deceleration start position G, the target vehicle-to-vehicle distance L, a deceleration start distance Lg, and a margin distance Lm. The margin distance Lm is a distance from the first vehicle N1 to the stop position D. The deceleration start distance Lg will be described in detail later.

FIG. 5B shows an overall length Ln1 of the first vehicle N1, a forward occupied distance Lf1 of the first vehicle N1, a rearward occupied distance Lr1 of the first vehicle N1, an overall length Ln2 of the second vehicle N2, a forward occupied distance Lf2 of the second vehicle N2, and a rearward occupied distance Lr2 of the second vehicle N2.

The forward occupied distance Lf1 of the first vehicle N1 and the rearward occupied distance Lr1 of the first vehicle N1 shown in FIG. 5B are preset with respect to the first vehicle N1. The forward occupied distance Lf1 and the rearward occupied distance Lr1 may be fixed values or values determined based on the overall length Ln1 of the first vehicle N1. The forward occupied distance Lf1 and the rearward occupied distance Lr1 may be set longer as the vehicle speed of the first vehicle N1 increases. The same applies to the forward occupied distance Lf2 and the rearward occupied distance Lr2 of the second vehicle N2.

In FIG. 5B, the waypoints W5 and W6 in a range of the overall length Ln1 of the first vehicle N1, the forward occupied distance Lf1 of the first vehicle N1, and the rearward occupied distance Lr1 of the first vehicle N1 are occupied by the first vehicle N1. The waypoints W1 and W2 have the same relationship with the second vehicle N2.

The stop position D is set by the parking place control server 10 in order that the second vehicle N2 performing the follow-up traveling can avoid excessively approaching the first vehicle N1. As shown in FIG. 5B, the stop position setter 13 sets the stop position D, for example, to the position of the waypoint W4 closest to the first vehicle N1 among the waypoints that are between the first vehicle N1 and the second vehicle N2 and are not occupied by the first vehicle N1. Other setting methods for the stop position D will be described later. By determining the stop position D, the margin distance Lm (distance from the first vehicle N1 to the stop position D) is also determined.

The deceleration start distance calculator 14 calculates the deceleration start distance Lg based on the position and the vehicle speed of the second vehicle N2 acquired by the vehicle information acquirer 11, and the stop position D set by the stop position setter 13. The deceleration start distance Lg is a distance between the stop position D and a position where the second vehicle N2 starts deceleration to stop at the stop position D. The deceleration start position G is a position behind the stop position D by the deceleration start distance Lg. The second vehicle N2 can stop at the stop position D by starting the deceleration from the deceleration start position G.

The deceleration start distance calculator 14 calculates the deceleration start distance Lg as, for example, a distance required for the second vehicle N2 to stop at the stop position D at a predetermined deceleration. The deceleration to be used for calculating the deceleration start distance Lg may be determined from a plurality of deceleration patterns prepared in advance based on a current vehicle speed of the second vehicle N2. The deceleration pattern is, for example, time-series data of deceleration until the second vehicle N2 stops.

The target vehicle-to-vehicle distance setter 15 sets the target vehicle-to-vehicle distance L to be used by the second vehicle N2 in the follow-up traveling. The target vehicle-to-vehicle distance setter 15 sets the target vehicle-to-vehicle distance L as a distance longer than the sum of the deceleration start distance Lg and the margin distance Lm from the stop position D to the first vehicle N1.

For example, the target vehicle-to-vehicle distance setter 15 calculates a reference target vehicle-to-vehicle distance Lb to be used in the follow-up traveling by a related-art method. The reference target vehicle-to-vehicle distance Lb may be a value to be used in general follow-up traveling. The reference target vehicle-to-vehicle distance Lb may be calculated as a predetermined distance based on the vehicle speed of the second vehicle N2. The reference target vehicle-to-vehicle distance may be acquired as vehicle information from the second vehicle N2. In the second vehicle N2, the target vehicle-to-vehicle distance during the follow-up traveling may be preset by a driver or vehicle manufacturer.

The target vehicle-to-vehicle distance setter 15 calculates the margin distance Lm based on the position of the first vehicle N1 acquired by the vehicle information acquirer 11 and the stop position D set by the stop position setter 13. The target vehicle-to-vehicle distance setter 15 determines whether the reference target vehicle-to-vehicle distance Lb is longer than the sum of the deceleration start distance Lg and the margin distance Lm. When the reference target vehicle-to-vehicle distance Lb is longer than the sum of the deceleration start distance Lg and the margin distance Lm, the target vehicle-to-vehicle distance setter 15 sets the reference target vehicle-to-vehicle distance Lb as the target vehicle-to-vehicle distance L. When the reference target vehicle-to-vehicle distance Lb is shorter than the sum of the deceleration start distance Lg and the margin distance Lm, the target vehicle-to-vehicle distance setter 15 sets the target vehicle-to-vehicle distance L to a distance obtained by adding a predetermined distance to the sum of the deceleration start distance Lg and the margin distance Lm. The predetermined distance is not particularly limited, but may be a short distance. The predetermined distance may be 1 cm or 5 cm.

Figure 6:
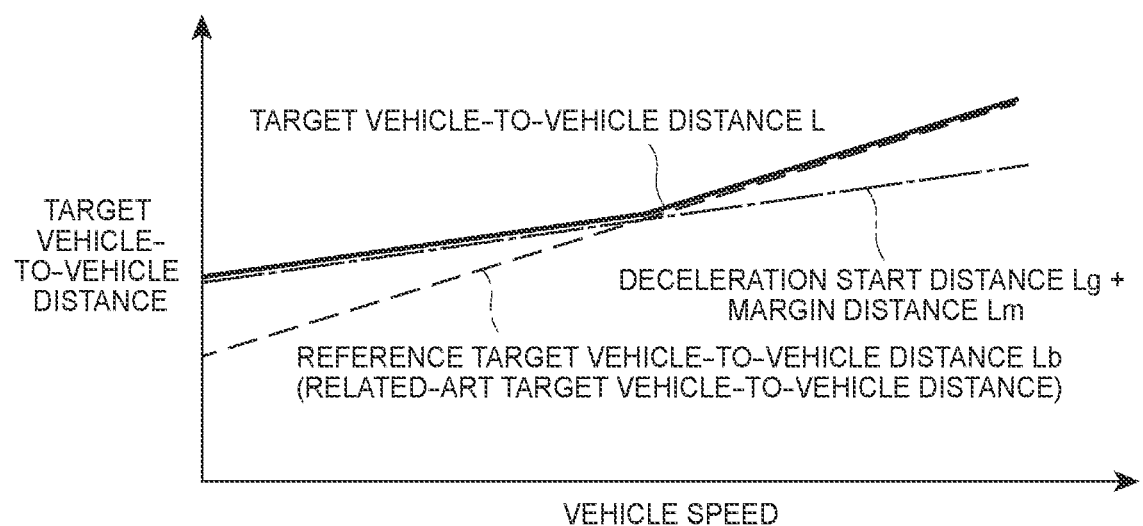
FIG. 6 is a graph showing an example of a relationship between a target vehicle-to-vehicle distance and a vehicle speed.

FIG. 6 is a graph showing an example of a relationship between the target vehicle-to-vehicle distance and the vehicle speed. In FIG. 6, a vertical axis corresponds to the target vehicle-to-vehicle distance L, and a horizontal axis corresponds to the vehicle speed of the second vehicle N2. In FIG. 6, the sum of the deceleration start distance Lg and the margin distance Lm is represented by a long dashed short dashed line, and the reference target vehicle-to-vehicle distance Lb is represented by a dashed line. In FIG. 6, the reference target vehicle-to-vehicle distance Lb is calculated longer as the vehicle speed of the second vehicle N2 increases.

As shown in FIG. 6, when the vehicle speed of the second vehicle N2 is low and the reference target vehicle-to-vehicle distance Lb is shorter than the sum of the deceleration start distance Lg and the margin distance Lm, the target vehicle-to-vehicle distance setter 15 sets the target vehicle-to-vehicle distance L to a distance obtained by adding the predetermined distance to the sum of the deceleration start distance Lg and the margin distance Lm. When the vehicle speed of the second vehicle N2 is high and the reference target vehicle-to-vehicle distance Lb is longer than the sum of the deceleration start distance Lg and the margin distance Lm, the target vehicle-to-vehicle distance setter 15 sets the reference target vehicle-to-vehicle distance Lb as the target vehicle-to-vehicle distance L.

Control Method for Automated Valet Parking System

Figure 7:
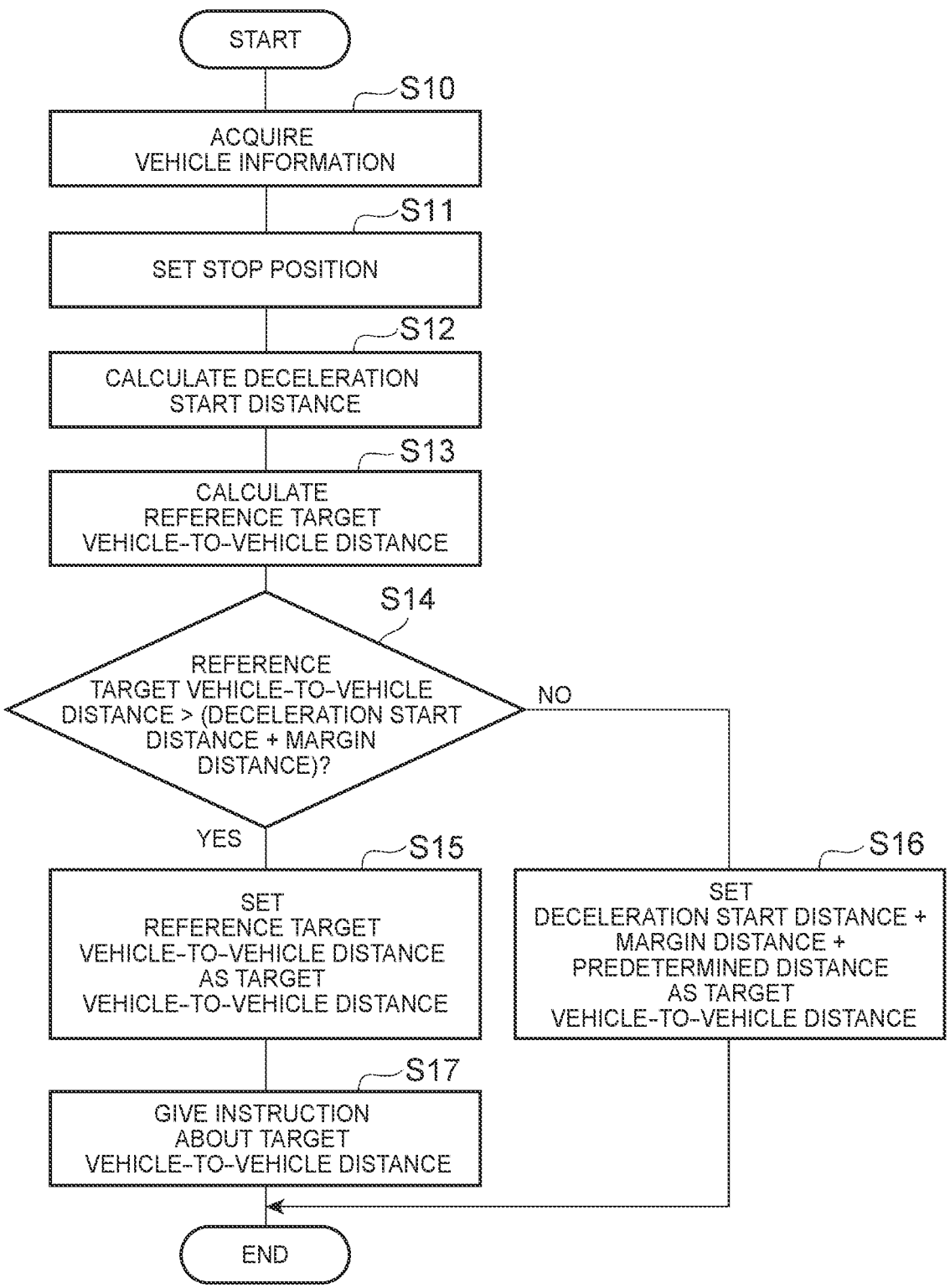
FIG. 7 is a flowchart showing an example of a target vehicle-to-vehicle distance setting process during follow-up traveling in the automated valet parking.

Next, an example of a control method for the automated valet parking system 1 according to the first embodiment will be described. FIG. 7 is a flowchart showing an example of a target vehicle-to-vehicle distance setting process during the follow-up traveling in the automated valet parking. The target vehicle-to-vehicle distance setting process shown in FIG. 7 is executed when the parking place control server 10 gives an instruction for the follow-up traveling. The target vehicle-to-vehicle distance setting process is repeatedly executed when the follow-up traveling is performed.

In S10 of FIG. 7, the parking place control server 10 of the automated valet parking system 1 causes the vehicle information acquirer 11 to acquire various types of information on the autonomous driving vehicles 2 in the parking place (vehicle information acquisition step). The vehicle information acquirer 11 acquires vehicle information of the autonomous driving vehicles 2 by communicating with the autonomous driving vehicles 2 in the parking place.

In S11, the parking place control server 10 causes the stop position setter 13 to set a stop position D (stop position setting step). The stop position setter 13 sets the stop position D based on the positions of the first vehicle N1 and the second vehicle N2.

In S12, the parking place control server 10 causes the deceleration start distance calculator 14 to calculate a deceleration start distance Lg (deceleration start distance calculation step). The deceleration start distance calculator 14 calculates the deceleration start distance Lg based on the position and the vehicle speed of the second vehicle N2 acquired by the vehicle information acquirer 11, and the stop position D set by the stop position setter 13. The deceleration start distance calculator 14 also calculates a margin distance Lm.

In S13, the parking place control server 10 causes the target vehicle-to-vehicle distance setter 15 to calculate a reference target vehicle-to-vehicle distance Lb (reference target vehicle-to-vehicle distance calculation step). The target vehicle-to-vehicle distance setter 15 calculates, for example, a predetermined reference target vehicle-to-vehicle distance Lb based on the vehicle speed of the second vehicle N2 (see FIG. 6).

In S14, the parking place control server 10 causes the target vehicle-to-vehicle distance setter 15 to determine whether the reference target vehicle-to-vehicle distance Lb is longer than the sum of the deceleration start distance Lg and the margin distance Lm (determination step). When determination is made that the reference target vehicle-to-vehicle distance Lb is longer than the sum of the deceleration start distance Lg and the margin distance Lm (S14: YES), the parking place control server 10 proceeds to S15. When determination is not made that the reference target vehicle-to-vehicle distance Lb is longer than the sum of the deceleration start distance Lg and the margin distance Lm (S14: NO), the parking place control server 10 proceeds to S16.

In S15, the parking place control server 10 causes the target vehicle-to-vehicle distance setter 15 to set the reference target vehicle-to-vehicle distance Lb as the target vehicle-to-vehicle distance L (target vehicle-to-vehicle distance setting step). Then, the parking place control server 10 proceeds to S17.

In S16, the parking place control server 10 causes the target vehicle-to-vehicle distance setter 15 to set the target vehicle-to-vehicle distance L to a distance obtained by adding the predetermined distance to the sum of the deceleration start distance Lg and the margin distance Lm (target vehicle-to-vehicle distance setting step). Then, the parking place control server 10 proceeds to S17.

In S17, the parking place control server 10 causes the vehicle controller 12 to instruct the second vehicle N2 about the target vehicle-to-vehicle distance L (target vehicle-to-vehicle distance instruction step). The second vehicle N2 performs the follow-up traveling so that the vehicle-to-vehicle distance from the first vehicle N1 that is the preceding vehicle reaches the target vehicle-to-vehicle distance L.

In the automated valet parking system 1 according to the first embodiment described above, the target vehicle-to-vehicle distance L is set as the distance longer than the sum of the deceleration start distance Lg and the margin distance Lm from the stop position D to the first vehicle N1. Therefore, unnecessary repetition of the acceleration of the second vehicle N2 for following the first vehicle N1 and the deceleration of the second vehicle N2 for stopping at the stop position D is avoided as compared with a case where the stop position D and the target vehicle-to-vehicle distance L of the second vehicle N2 are independently set by the parking place control server 10. Thus, it is possible to suppress a decrease in the traveling efficiency of the second vehicle N2 during the follow-up traveling.

In the automated valet parking system 1, the stop position D is set by using the waypoints. Therefore, the amount of arithmetic processing can be reduced as compared with a case where the stop position D is set to an arbitrary position, thereby facilitating the change of the stop position D based on the traveling of the first vehicle N1.

Second Embodiment

An autonomous driving vehicle 100 according to a second embodiment is capable of executing the automated valet parking in response to an instruction from a parking place control server 110. The parking place control server 110 according to the second embodiment does not have the functions of the deceleration start distance calculator 14 and the target vehicle-to-vehicle distance setter 15 as compared with the parking place control server 10 according to the first embodiment. The autonomous driving vehicle 100 has the functions corresponding to the deceleration start distance calculator 14 and the target vehicle-to-vehicle distance setter 15.

The autonomous driving vehicle 100 performs the follow-up traveling to follow a preceding vehicle in response to an instruction from the parking place control server 110. In the situation shown in FIG. 5B, the preceding vehicle corresponds to the first vehicle N1, and the autonomous driving vehicle 100 corresponds to the second vehicle N2.

Figure 8:
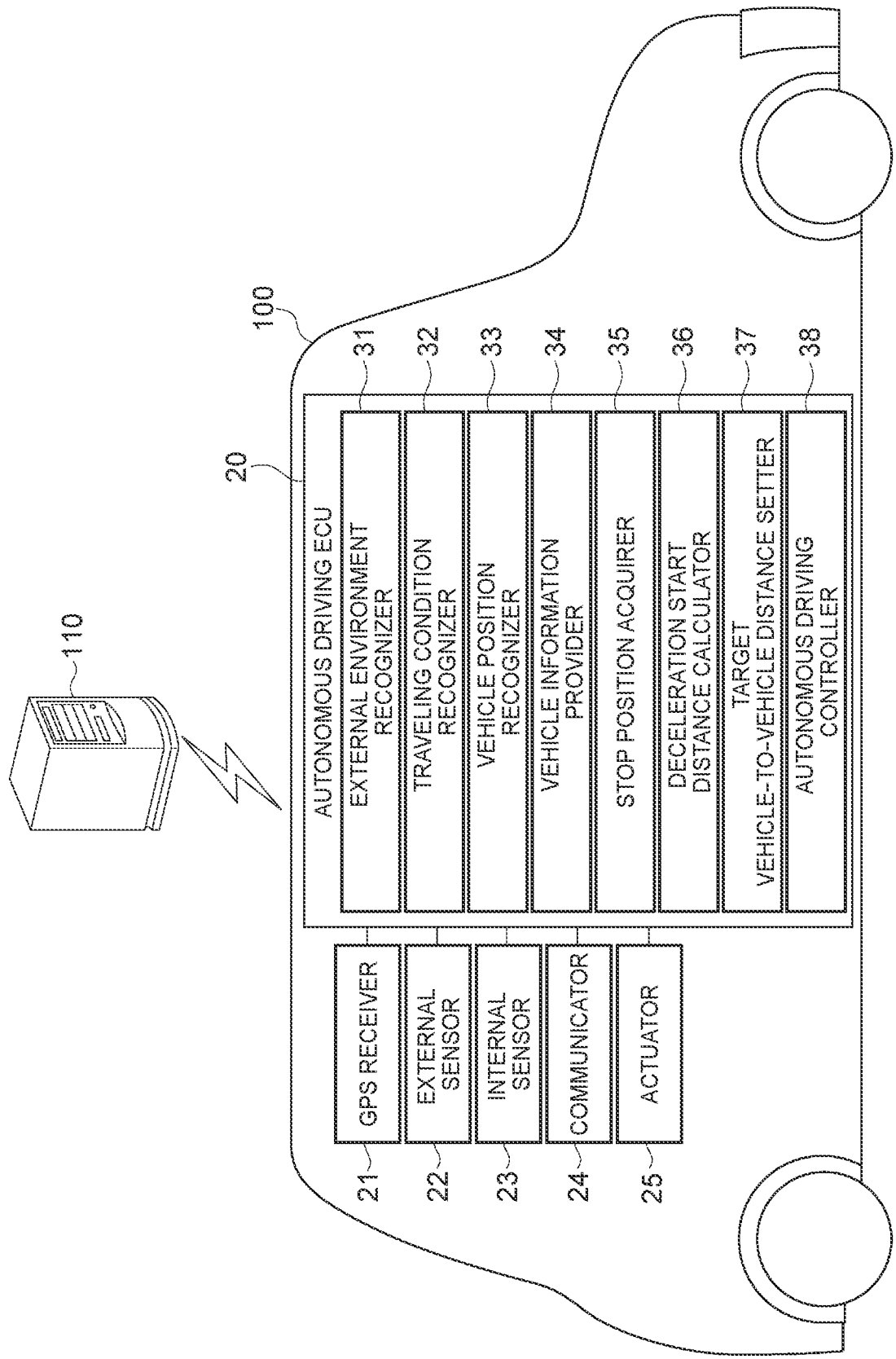
FIG. 8 is a diagram illustrating an autonomous driving vehicle according to a second embodiment.

FIG. 8 is a diagram illustrating the autonomous driving vehicle according to the second embodiment. As shown in FIG. 8, the autonomous driving vehicle 100 includes, for example, an autonomous driving electronic control unit (ECU) 20. The autonomous driving ECU 20 is an electronic control unit including a CPU, a ROM, a RAM, and the like. In the autonomous driving ECU 20, for example, a program recorded in the ROM is loaded into the RAM, and the program loaded in the RAM is executed by the CPU to implement various functions. The autonomous driving ECU 20 may be constituted by a plurality of electronic units.

The autonomous driving ECU 20 is connected to a global positioning system (GPS) receiver 21, an external sensor 22, an internal sensor 23, a communicator 24, and an actuator 25.

The GPS receiver 21 measures the position of the autonomous driving vehicle 100 (for example, the latitude and longitude of the autonomous driving vehicle 100) by receiving signals from a plurality of GPS satellites. The GPS receiver 21 transmits information on the measured position of the autonomous driving vehicle 100 to the autonomous driving ECU 20. A global navigation satellite system (GNSS) receiver may be used instead of the GPS receiver 21.

The external sensor 22 is an in-vehicle sensor that detects an external environment of the autonomous driving vehicle 100. The external sensor 22 includes at least a camera. The camera is an imaging device that images the external environment of the autonomous driving vehicle 100. The camera is provided on, for example, a back side of a windshield of the autonomous driving vehicle 100, and images a view ahead of the vehicle. The camera transmits imaging information related to the external environment of the autonomous driving vehicle 100 to the autonomous driving ECU 20. The camera may be a monocular camera or a stereo camera. A plurality of cameras may be provided to image views on the right and left sides and the rear side of the autonomous driving vehicle 100 in addition to the view ahead of the autonomous driving vehicle 100.

The external sensor 22 may include a radar sensor. The radar sensor is a detection device that detects an object around the autonomous driving vehicle 100 by using radio waves (for example, millimeter waves) or light. Examples of the radar sensor include a millimeter-wave radar and a light detection and ranging (LIDAR) sensor. The radar sensor detects an object by transmitting radio waves or light to the surroundings of the autonomous driving vehicle 100 and receiving the radio waves or light reflected by the object. The radar sensor transmits information on the detected object to the autonomous driving ECU 20. The external sensor 22 may include a sonar sensor that detects sounds outside the autonomous driving vehicle 100.

The internal sensor 23 is an in-vehicle sensor that detects traveling conditions of the autonomous driving vehicle 100. The internal sensor 23 includes a vehicle speed sensor, an acceleration sensor, and a yaw rate sensor. The vehicle speed sensor is a detector that detects the speed of the autonomous driving vehicle 100. The vehicle speed sensor may be a wheel speed sensor that is provided on each wheel of the autonomous driving vehicle 100 or a drive shaft that rotates together with the wheel and detects a rotation speed of the wheel. The vehicle speed sensor transmits information on the detected vehicle speed (wheel speed) to the autonomous driving ECU 20.

The acceleration sensor is a detector that detects the acceleration of the autonomous driving vehicle 100. The acceleration sensor includes, for example, a longitudinal acceleration sensor that detects an acceleration of the autonomous driving vehicle 100 in a fore-and-aft direction. The acceleration sensor may include a lateral acceleration sensor that detects a lateral acceleration of the autonomous driving vehicle 100. For example, the acceleration sensor transmits information on the acceleration of the autonomous driving vehicle 100 to the autonomous driving ECU 20. The yaw rate sensor is a detector that detects a yaw rate (rotational angular velocity) about a vertical axis of the center of gravity of the autonomous driving vehicle 100. Examples of the yaw rate sensor include a gyro sensor. The yaw rate sensor transmits information on the detected yaw rate of the autonomous driving vehicle 100 to the autonomous driving ECU 20.

The communicator 24 is a communication device that controls wireless communication with the outside of the autonomous driving vehicle 100. The communicator 24 transmits and receives various types of information by communicating with the parking place control server 110. For example, the communicator 24 transmits vehicle information to the parking place control server 110, and acquires information necessary for the automated valet parking (for example, information on landmarks along a target route) from the parking place control server 110.

The actuator 25 is a device to be used to control the autonomous driving vehicle 100. The actuator 25 includes at least a drive actuator, a brake actuator, and a steering actuator. The drive actuator controls a drive force of the autonomous driving vehicle 100 by controlling the amount of air to be supplied to an engine (throttle valve opening degree) in response to a control signal from the autonomous driving ECU 20. When the autonomous driving vehicle 100 is a hybrid electric vehicle, the drive force is controlled by inputting a control signal from the autonomous driving ECU 20 to a motor serving as a power source, in addition to the amount of air to be supplied to the engine. When the autonomous driving vehicle 100 is a battery electric vehicle, the drive force is controlled by inputting a control signal from the autonomous driving ECU 20 to a motor serving as a power source. In such cases, the motor serving as the power source constitutes the actuator 25.

The brake actuator controls a braking force to be applied to the wheels of the autonomous driving vehicle 100 by controlling a brake system in response to a control signal from the autonomous driving ECU 20. Examples of the brake system include a hydraulic brake system. The steering actuator controls drive of an assist motor that controls a steering torque in an electric power steering system in response to a control signal from the autonomous driving ECU 20. Thus, the steering actuator controls the steering torque of the autonomous driving vehicle 100.

Next, an example of the functional configuration of the autonomous driving ECU 20 will be described. The autonomous driving ECU 20 includes an external environment recognizer 31, a traveling condition recognizer 32, a vehicle position recognizer 33, a vehicle information provider 34, a stop position acquirer 35, a deceleration start distance calculator 36, a target vehicle-to-vehicle distance setter 37, and an autonomous driving controller 38.

The external environment recognizer 31 recognizes an external environment of the autonomous driving vehicle 100 based on a detection result from the external sensor 22 (image captured by the camera or information on an object detected by the radar sensor). The external environment includes the positions of surrounding objects relative to the autonomous driving vehicle 100. The external environment may include the speeds and moving directions of surrounding objects relative to the autonomous driving vehicle 100. The external environment recognizer 31 recognizes objects such as other vehicles and pillars of the parking place by pattern matching or the like. The external environment recognizer 31 may recognize the gates of the parking place, the walls of the parking place, poles, traffic cones, and the like. The external environment recognizer 31 may recognize driving boundaries in the parking place by recognizing white lines.

The traveling condition recognizer 32 recognizes traveling conditions of the autonomous driving vehicle 100 based on detection results from the internal sensor 23. The traveling conditions include a vehicle speed of the autonomous driving vehicle 100, an acceleration of the autonomous driving vehicle 100, and a yaw rate of the autonomous driving vehicle 100. Specifically, the traveling condition recognizer 32 recognizes the vehicle speed of the autonomous driving vehicle 100 based on vehicle speed information from the vehicle speed sensor. The traveling condition recognizer 32 recognizes the acceleration of the autonomous driving vehicle 100 based on acceleration information from the acceleration sensor. The traveling condition recognizer 32 recognizes the direction of the autonomous driving vehicle 100 based on yaw rate information from the yaw rate sensor.

The vehicle position recognizer 33 recognizes a position of the autonomous driving vehicle 100 in the parking place based on the parking place map information acquired from the parking place control server 110 via the communicator 24 and the external environment recognized by the external environment recognizer 31.

The vehicle position recognizer 33 recognizes the position of the autonomous driving vehicle 100 in the parking place based on position information of the landmarks in the parking place in the parking place map information and positions of the landmarks relative to the autonomous driving vehicle 100 that are recognized by the external environment recognizer 31. The landmarks may be objects fixed in the parking place.

The vehicle position recognizer 33 may recognize the position of the autonomous driving vehicle 100 by dead reckoning based on the detection results from the internal sensor 23. The vehicle position recognizer 33 may recognize the position of the autonomous driving vehicle 100 by communicating with a beacon provided in the parking place.

The vehicle information provider 34 provides vehicle information to the parking place control server 110 via the communicator 24. The vehicle information provider 34 provides the parking place control server 110 with vehicle information including, for example, information on positions of the autonomous driving vehicle 100 in the parking place that are recognized by the vehicle position recognizer 33 at regular time intervals. The vehicle information may include the external environment (including a vehicle-to-vehicle distance from a preceding vehicle) and/or the traveling conditions recognized by the autonomous driving vehicle 100.

The stop position acquirer 35 acquires information on a stop position D set by the parking place control server 110 when the autonomous driving vehicle 100 performs the follow-up traveling to follow a preceding vehicle in the parking place in response to an instruction from the parking place control server 110. The stop position D may be set by the parking place control server 110 in the same manner as that in the first embodiment.

The stop position acquirer 35 may acquire the information on the stop position D in association with a position on the parking place map, or may acquire the information on the stop position D as a distance from the autonomous driving vehicle 100. The stop position D may be associated with a waypoint or set as a position unrelated to the waypoint. The stop position acquirer 35 calculates a margin distance Lm from the stop position D to the preceding vehicle based on the stop position D and a distance from the autonomous driving vehicle 100 to the preceding vehicle that is recognized by the external environment recognizer 31.

The deceleration start distance calculator 36 calculates a deceleration start distance Lg based on the position of the autonomous driving vehicle 100 that is recognized by the vehicle position recognizer 33, the vehicle speed of the autonomous driving vehicle 100 that is recognized by the traveling condition recognizer 32, and the stop position D acquired by the stop position acquirer 35. The deceleration start distance Lg is a distance between the stop position D and a position where the autonomous driving vehicle 100 starts deceleration to stop at the stop position D. A deceleration start position G is a position behind the stop position D by the deceleration start distance Lg when viewed from the autonomous driving vehicle 100. The autonomous driving vehicle 100 can stop at the stop position D by starting the deceleration from the deceleration start position G.

The deceleration start distance calculator 36 calculates the deceleration start distance Lg as, for example, a distance required for the autonomous driving vehicle 100 to stop at the stop position D at the predetermined deceleration. The deceleration to be used for calculating the deceleration start distance Lg may be determined from a plurality of deceleration patterns prepared in advance based on a current vehicle speed of the autonomous driving vehicle 100.

The target vehicle-to-vehicle distance setter 37 sets a target vehicle-to-vehicle distance between the preceding vehicle and the autonomous driving vehicle 100 when the autonomous driving vehicle 100 performs the follow-up traveling to follow the preceding vehicle in the parking place in response to an instruction from the parking place control server 110. The target vehicle-to-vehicle distance setter 37 sets the target vehicle-to-vehicle distance L as a distance longer than the sum of the deceleration start distance Lg and the margin distance Lm from the stop position D to the preceding vehicle.

For example, the target vehicle-to-vehicle distance setter 37 calculates a reference target vehicle-to-vehicle distance Lb to be used in the follow-up traveling by a related-art method. The method for calculating the reference target vehicle-to-vehicle distance Lb may be the same as that in the first embodiment. The reference target vehicle-to-vehicle distance Lb may be a target vehicle-to-vehicle distance preset by a driver for the autonomous driving vehicle 100.

The target vehicle-to-vehicle distance setter 37 determines whether the reference target vehicle-to-vehicle distance Lb is longer than the sum of the deceleration start distance Lg and the margin distance Lm. When the reference target vehicle-to-vehicle distance Lb is longer than the sum of the deceleration start distance Lg and the margin distance Lm, the target vehicle-to-vehicle distance setter 37 sets the reference target vehicle-to-vehicle distance Lb as the target vehicle-to-vehicle distance L. When the reference target vehicle-to-vehicle distance Lb is shorter than the sum of the deceleration start distance Lg and the margin distance Lm, the target vehicle-to-vehicle distance setter 37 sets the target vehicle-to-vehicle distance L to a distance obtained by adding the predetermined distance to the sum of the deceleration start distance Lg and the margin distance Lm.

The autonomous driving controller 38 causes the autonomous driving vehicle 100 to perform autonomous driving. The autonomous driving controller 38 causes the autonomous driving vehicle 100 to perform the follow-up traveling to follow the preceding vehicle in response to an instruction from the parking place control server 110. The autonomous driving controller 38 performs the follow-up traveling by using the target vehicle-to-vehicle distance L set by the target vehicle-to-vehicle distance setter 37.

Control Method for Autonomous Driving Vehicle

Figure 9:
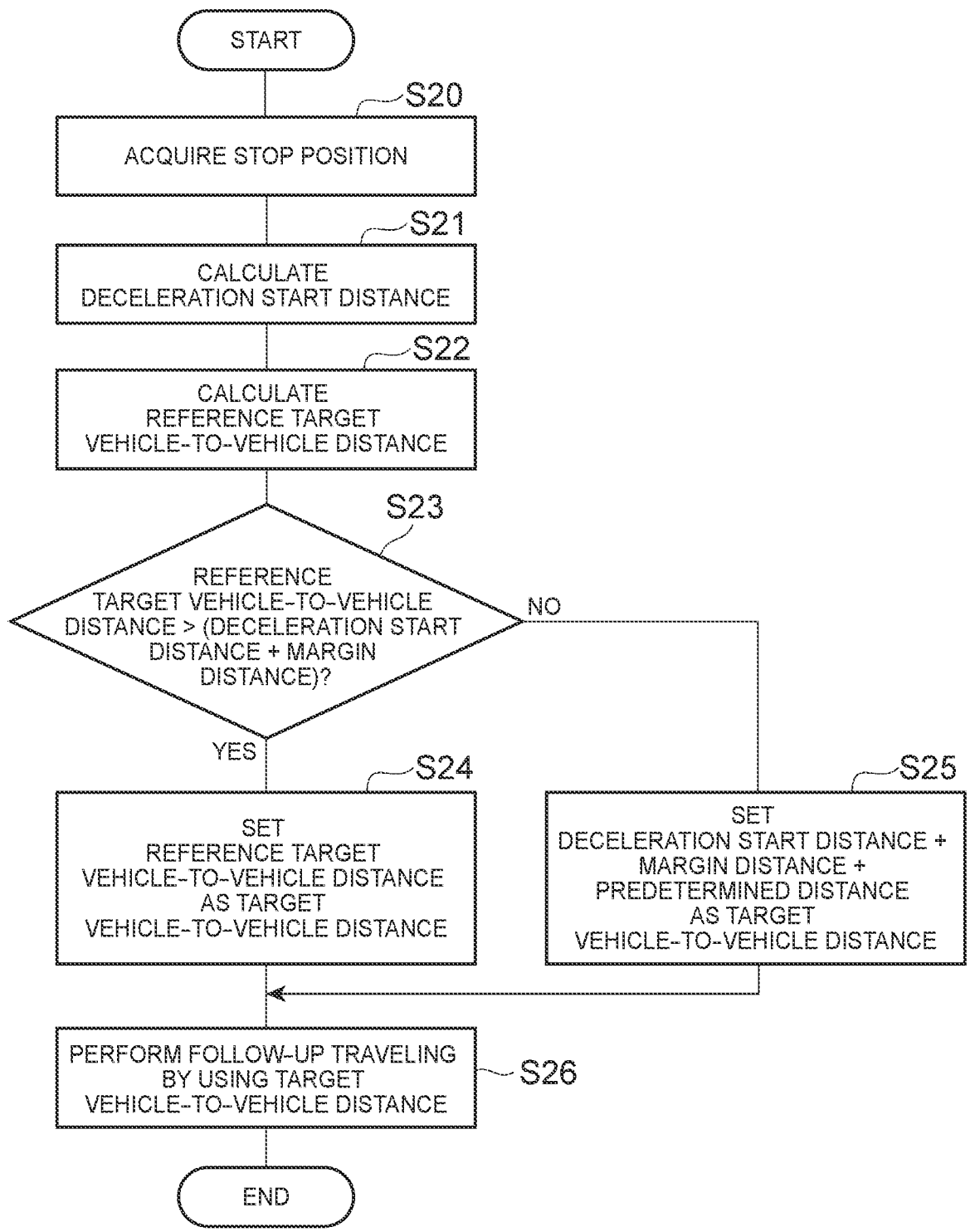
FIG. 9 is a flowchart showing an example of a target vehicle-to-vehicle distance setting process during the follow-up traveling in the automated valet parking according to the second embodiment.

Next, an example of a control method for the autonomous driving vehicle 100 according to the second embodiment will be described. FIG. 9 is a flowchart showing an example of a target vehicle-to-vehicle distance setting process during the follow-up traveling in the automated valet parking according to the second embodiment. The target vehicle-to-vehicle distance setting process shown in FIG. 9 is executed when the parking place control server 110 gives an instruction for the follow-up traveling to the autonomous driving vehicle 100. The target vehicle-to-vehicle distance setting process is repeatedly executed when the follow-up traveling is performed.

In S20 of FIG. 9, the autonomous driving ECU 20 of the autonomous driving vehicle 100 causes the stop position acquirer 35 to acquire a stop position D of the autonomous driving vehicle 100 relative to a preceding vehicle (stop position acquisition step). The stop position acquirer 35 calculates a margin distance Lm from the stop position D to the preceding vehicle based on the stop position D and a distance from the autonomous driving vehicle 100 to the preceding vehicle that is recognized by the external environment recognizer 31.

In S21, the autonomous driving ECU 20 causes the deceleration start distance calculator 36 to calculate a deceleration start distance Lg (deceleration start distance calculation step). The deceleration start distance calculator 36 calculates the deceleration start distance Lg based on a position of the autonomous driving vehicle 100, a vehicle speed of the autonomous driving vehicle 100, and the stop position D.

In S22, the autonomous driving ECU 20 causes the target vehicle-to-vehicle distance setter 37 to calculate a reference target vehicle-to-vehicle distance Lb (reference target vehicle-to-vehicle distance calculation step). The target vehicle-to-vehicle distance setter 37 calculates the reference target vehicle-to-vehicle distance Lb based on, for example, the vehicle speed of the autonomous driving vehicle 100.

In S23, the autonomous driving ECU 20 causes the target vehicle-to-vehicle distance setter 37 to determine whether the reference target vehicle-to-vehicle distance Lb is longer than the sum of the deceleration start distance Lg and the margin distance Lm (determination step). When determination is made that the reference target vehicle-to-vehicle distance Lb is longer than the sum of the deceleration start distance Lg and the margin distance Lm (S23: YES), the autonomous driving ECU 20 proceeds to S24. When determination is not made that the reference target vehicle-to-vehicle distance Lb is longer than the sum of the deceleration start distance Lg and the margin distance Lm (S23: NO), the autonomous driving ECU 20 proceeds to S25.

In S24, the autonomous driving ECU 20 causes the target vehicle-to-vehicle distance setter 37 to set the reference target vehicle-to-vehicle distance Lb as the target vehicle-to-vehicle distance L (target vehicle-to-vehicle distance setting step). Then, the autonomous driving ECU 20 proceeds to S26.

In S25, the autonomous driving ECU 20 causes the target vehicle-to-vehicle distance setter 37 to set the target vehicle-to-vehicle distance L to a distance obtained by adding the predetermined distance to the sum of the deceleration start distance Lg and the margin distance Lm (target vehicle-to-vehicle distance setting step). Then, the autonomous driving ECU 20 proceeds to S26.

In S26, the autonomous driving ECU 20 causes the autonomous driving controller 38 to perform the follow-up traveling by using the target vehicle-to-vehicle distance L (vehicle control step). The autonomous driving vehicle 100 adjusts the vehicle speed so that the vehicle-to-vehicle distance from the preceding vehicle reaches the target vehicle-to-vehicle distance L.

In the autonomous driving vehicle 100 according to the second embodiment described above, the target vehicle-to-vehicle distance L is set as the distance longer than the sum of the deceleration start distance Lg and the margin distance Lm from the stop position D to the preceding vehicle. Therefore, unnecessary repetition of the acceleration of the autonomous driving vehicle 100 for following the preceding vehicle and the deceleration of the autonomous driving vehicle 100 for stopping at the stop position D is avoided as compared with a case where the stop position D and the target vehicle-to-vehicle distance L of the autonomous driving vehicle 100 are independently set by the parking place control server 110. Thus, it is possible to suppress a decrease in the traveling efficiency during the follow-up traveling.

Although the embodiments of the present disclosure have been described above, the present disclosure is not limited to the embodiments described above. The present disclosure may be carried out in various forms having various changes and improvements based on the knowledge of those skilled in the art, including the embodiments described above.

The autonomous driving vehicle 2 according to the first embodiment may be the same as the autonomous driving vehicle 100 of the second embodiment. Additionally, the autonomous driving vehicle 2 according to the first embodiment may be the autonomous driving vehicle 100 of the second embodiment from which the functions of the stop position acquirer 35, the deceleration start distance calculator 36, and the target vehicle-to-vehicle distance setter 37 are omitted.

For example, a transport robot capable of transporting another vehicle (parking target vehicle) may be used as each of the autonomous driving vehicles 2 and 100. The parking target vehicle may be a general vehicle without an autonomous driving function, or may be an autonomous driving vehicle. The transport robot includes, for example, a lift mechanism capable of lifting and holding the parking target vehicle. Each of the parking place control servers 10 and 110 instructs the transport robot to transport the parking target vehicle, thereby achieving the automated valet parking of the parking target vehicle. Each of the parking place control servers 10 and 110 also instructs the transport robots to perform the follow-up traveling.

The rearward occupied distance Lr1 of the first vehicle N1 (preceding vehicle) need not be used for setting the stop position D. The stop position D may be set to a position of a waypoint closest to the first vehicle N1 behind the first vehicle N1, or to a position of a waypoint second closest to the first vehicle N1 behind the first vehicle N1. The waypoints need not be used for setting the stop position D. The stop position D may be set to any position in the parking place regardless of the waypoints. The stop position D may be a position closer to the second vehicle N2 by a preset distance from the position of the first vehicle N1.

The reference target vehicle-to-vehicle distance Lb need not be used for setting the target vehicle-to-vehicle distance L. A distance longer than the sum of the deceleration start distance Lg and the margin distance Lm may be calculated as the target vehicle-to-vehicle distance L.

An automated valet parking system that causes a first vehicle and a second vehicle that are autonomous driving vehicles to perform automated valet parking according to a first aspect of the present disclosure includes one or more processors configured to cause the second vehicle to perform follow-up traveling to follow the first vehicle in a parking place, the follow-up traveling being included in automated valet parking; set a stop position between the first vehicle and the second vehicle when the second vehicle is performing the follow-up traveling to follow the first vehicle in the parking place; calculate, based on a position of the second vehicle, a vehicle speed of the second vehicle, and the stop position, a deceleration start distance between the stop position and a position where the second vehicle starts deceleration to stop at the stop position; set a target vehicle-to-vehicle distance of the second vehicle from the first vehicle in the follow-up traveling; and set, as the target vehicle-to-vehicle distance, a distance longer than a sum of the deceleration start distance and a margin distance from the stop position to the first vehicle.

In the aspect described above, a traveling path of the parking place may include a plurality of waypoints to be used for an instruction, the waypoints being preset along an extending direction of the traveling path and including first waypoints that are between the first vehicle and the second vehicle and spaced away from the first vehicle by a predetermined occupancy distance or longer; and the one or more processors may be configured to set the stop position based on the first waypoints.

In the aspect described above, a traveling path of the parking place may include a plurality of waypoints to be used for an instruction, the waypoints being preset along an extending direction of the traveling path and including first waypoints that are between the first vehicle and the second vehicle and spaced away from the first vehicle by a predetermined occupancy distance or longer; and the one or more processors may be configured to set, as the stop position, a second waypoint closest to the first vehicle among the first waypoints. In the automated valet parking system, the stop position is set by using the waypoints. Therefore, the amount of arithmetic processing can be reduced as compared with a case where the stop position is set to an arbitrary position, thereby facilitating the change of the stop position based on the traveling of the first vehicle.

In the aspect described above, the one or more processors may be configured to when a predetermined reference target vehicle-to-vehicle distance is longer than the sum of the deceleration start distance and the margin distance, set the predetermined reference target vehicle-to-vehicle distance as the target vehicle-to-vehicle distance, when the predetermined reference target vehicle-to-vehicle distance is shorter than the sum of the deceleration start distance and the margin distance, set the target vehicle-to-vehicle distance to a distance obtained by adding a predetermined distance to the sum of the deceleration start distance and the margin distance.

A second aspect of the present disclosure relates to a control method to be executed by an automated valet parking system that causes a first vehicle and a second vehicle that are autonomous driving vehicles to perform automated valet parking. The control method includes causing the second vehicle to perform follow-up traveling to follow the first vehicle in a parking place, the follow-up traveling being included in automated valet parking; setting a stop position between the first vehicle and the second vehicle when the second vehicle is performing the follow-up traveling to follow the first vehicle in the parking place; calculating, based on a position of the second vehicle, a vehicle speed of the second vehicle, and the stop position, a deceleration start distance between the stop position and a position where the second vehicle starts deceleration to stop at the stop position; and setting a target vehicle-to-vehicle distance of the second vehicle from the first vehicle in the follow-up traveling, the target vehicle-to-vehicle distance being set as a distance longer than a sum of the deceleration start distance and a margin distance from the stop position to the first vehicle.

In the control method for the automated valet parking system according to the second aspect, the target vehicle-to-vehicle distance is set as the distance longer than the sum of the deceleration start distance and the margin distance from the stop position to the first vehicle. Therefore, unnecessary repetition of acceleration of the second vehicle for following the first vehicle and deceleration of the second vehicle for stopping at the stop position is avoided. Thus, it is possible to suppress a decrease in the traveling efficiency during the follow-up traveling.

An autonomous driving vehicle according to a third aspect of the present disclosure includes acquire, from a parking place control server, a stop position set between a preceding vehicle and the autonomous driving vehicle by the parking place control server when the autonomous driving vehicle is performing follow-up traveling to follow the preceding vehicle in a parking place in response to an instruction from the parking place control server, the follow-up traveling being included in automated valet parking; calculate, based on a position of the autonomous driving vehicle, a vehicle speed of the autonomous driving vehicle, and the stop position, a deceleration start distance between the stop position and a position where the autonomous driving vehicle starts deceleration to stop at the stop position; set a target vehicle-to-vehicle distance of the autonomous driving vehicle from the preceding vehicle in the follow-up traveling; and set the target vehicle-to-vehicle distance as a distance longer than a sum of the deceleration start distance and a margin distance from the stop position to the preceding vehicle.

In the autonomous driving vehicle according to the third aspect, the target vehicle-to-vehicle distance is set as the distance longer than the sum of the deceleration start distance and the margin distance from the stop position to the preceding vehicle. Therefore, unnecessary repetition of acceleration of the autonomous driving vehicle for following the preceding vehicle and deceleration of the autonomous driving vehicle for stopping at the stop position is avoided. Thus, it is possible to suppress a decrease in the traveling efficiency during the follow-up traveling.

What is claimed is:
1. An automated valet parking system that causes a first vehicle and a second vehicle that are autonomous driving vehicles to perform automated valet parking comprising one or more processors configured to:
cause the second vehicle to perform follow-up traveling to follow the first vehicle in a parking place, the follow-up traveling being included in automated valet parking;

set a stop position between the first vehicle and the second vehicle when the second vehicle is performing the follow-up traveling to follow the first vehicle in the parking place;

calculate, based on a position of the second vehicle, a vehicle speed of the second vehicle, and the stop position, a deceleration start distance between the stop position and a position where the second vehicle starts deceleration to stop at the stop position;

set a target vehicle-to-vehicle distance of the second vehicle from the first vehicle in the follow-up traveling; and set, as the target vehicle-to-vehicle distance, a distance longer than a sum of the deceleration start distance and a margin distance from the stop position to the first vehicle.

2. The automated valet parking system according to claim 1, wherein:

a traveling path of the parking place includes a plurality of waypoints to be used for an instruction, the waypoints being preset along an extending direction of the traveling path and including first waypoints that are between the first vehicle and the second vehicle and spaced away from the first vehicle by a predetermined occupancy distance or longer; and the one or more processors are configured to set the stop position based on the first waypoints.

3. The automated valet parking system according to claim 1, wherein:

a traveling path of the parking place includes a plurality of waypoints to be used for an instruction, the waypoints being preset along an extending direction of the traveling path and including first waypoints that are between the first vehicle and the second vehicle and spaced away from the first vehicle by a predetermined occupancy distance or longer; and the one or more processors are configured to set, as the stop position, a second waypoint closest to the first vehicle among the first waypoints.

4. The automated valet parking system according to claim 1, wherein the one or more processors are configured to:

when a predetermined reference target vehicle-to-vehicle distance is longer than the sum of the deceleration start distance and the margin distance, set the predetermined reference target vehicle-to-vehicle distance as the target vehicle-to-vehicle distance, when the predetermined reference target vehicle-to-vehicle distance is shorter than the sum of the deceleration start distance and the margin distance, set the target vehicle-to-vehicle distance to a distance obtained by adding a predetermined distance to the sum of the deceleration start distance and the margin distance.

5. A control method to be executed by an automated valet parking system that causes a first vehicle and a second vehicle that are autonomous driving vehicles to perform automated valet parking, the control method comprising:

causing a second vehicle to perform follow-up traveling to follow a first vehicle in a parking place, the follow-up traveling being included in automated valet parking;

setting a stop position between the first vehicle and the second vehicle when the second vehicle is performing the follow-up traveling to follow the first vehicle in the parking place;

calculating, based on a position of the second vehicle, a vehicle speed of the second vehicle, and the stop position, a deceleration start distance between the stop position and a position where the second vehicle starts deceleration to stop at the stop position; and setting a target vehicle-to-vehicle distance of the second vehicle from the first vehicle in the follow-up traveling, the target vehicle-to-vehicle distance being set as a distance longer than a sum of the deceleration start distance and a margin distance from the stop position to the first vehicle.

6. An autonomous driving vehicle comprising one or more processors configured to:

acquire, from a parking place control server, a stop position set between a preceding vehicle and the autonomous driving vehicle by the parking place control server when the autonomous driving vehicle is performing follow-up traveling to follow the preceding vehicle in a parking place in response to an instruction from the parking place control server, the follow-up traveling being included in automated valet parking;

calculate, based on a position of the autonomous driving vehicle, a vehicle speed of the autonomous driving vehicle, and the stop position, a deceleration start distance between the stop position and a position where the autonomous driving vehicle starts deceleration to stop at the stop position;

set a target vehicle-to-vehicle distance of the autonomous driving vehicle from the preceding vehicle in the follow-up traveling; and set the target vehicle-to-vehicle distance as a distance longer than a sum of the deceleration start distance and a margin distance from the stop position to the preceding vehicle.

* * * * *